United States Patent
Niaf et al.

(10) Patent No.: US 11,715,324 B2
(45) Date of Patent: Aug. 1, 2023

(54) METHOD FOR EXTRACTING A SIGNATURE OF A FINGERPRINT AND DEVICE IMPLEMENTING SAID METHOD

(71) Applicant: IDEMIA IDENTITY & SECURITY FRANCE, Courbevoie (FR)

(72) Inventors: Emilie Niaf, Courbevoie (FR); Laurent Kazdaghli, Courbevoie (FR); Anthony Cazasnoves, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/548,819

(22) Filed: Dec. 13, 2021

(65) Prior Publication Data
US 2022/0198824 A1   Jun. 23, 2022

(30) Foreign Application Priority Data
Dec. 21, 2020   (FR) ...................................... 2013844

(51) Int. Cl.
 *G06V 40/13*   (2022.01)
 *G06V 40/12*   (2022.01)
 *G06V 10/82*   (2022.01)

(52) U.S. Cl.
 CPC .......... *G06V 40/1371* (2022.01); *G06V 10/82* (2022.01); *G06V 40/1353* (2022.01)

(58) Field of Classification Search
 CPC . G06V 40/1371; G06V 40/1353; G06V 10/82
 See application file for complete search history.

(56) References Cited

U.S. PATENT DOCUMENTS

| | | | | |
|---|---|---|---|---|
| 6,466,686 | B2* | 10/2002 | Senior | G06V 40/1347 382/268 |
| 10,198,612 | B1 | 2/2019 | Hsu | |
| 2005/0069179 | A1* | 3/2005 | Hwang | G06V 10/993 382/124 |
| 2012/0057764 | A1* | 3/2012 | Hara | G06V 40/1371 382/125 |
| 2018/0165508 | A1 | 6/2018 | Othman et al. | |
| 2021/0124899 | A1* | 4/2021 | Cazasnoves | G06T 7/194 |

OTHER PUBLICATIONS

Sep. 21, 2021 Search Report issued in French Patent Application No. 2013844.
Ghafoor et al; "Fingerprint frequency normalisation and enhancement using two-dimensional short-time Fourier transform analysis;" IET Computer Vision. The Institution of Engineering and Technology; vol. 10. No. 8; Dec. 1, 2016.

(Continued)

*Primary Examiner* — Stephen G Sherman
(74) *Attorney, Agent, or Firm* — Oliff PLC

(57) ABSTRACT

A method for extracting a signature of a fingerprint shown on a source image is described. For this purpose, the source image is transformed into the frequency domain. One or more ridge frequencies are next determined by means of a convolutional neural network applied to said transformed image, n being an integer greater than or equal to 1. The source image is normalized in response to said n ridge frequencies determined. One or more signatures of said fingerprint are finally extracted from said n normalized images.

9 Claims, 3 Drawing Sheets

(56) References Cited

OTHER PUBLICATIONS

Takahashi et al; "Fingerprint Feature 1-11 Extraction by Combining Texture. Minutiae, and Frequency Spectrum Using Multi-Task CNN;" 2020 IEEE International Joint Conference on Biometrics; Sep. 28, 2020.

Maio et al.; "Neural network based 1-11 minutiae filtering in fingerprints;" Pattern Recognition, 1998. Proceedings. Fourteenth International Conference; vol. 2; Aug. 16, 1998.

* cited by examiner

METHOD FOR EXTRACTING A SIGNATURE OF A FINGERPRINT AND DEVICE IMPLEMENTING SAID METHOD

TECHNICAL FIELD

At least one embodiment relates to a method for extracting a signature of a fingerprint represented by a source image.

PRIOR ART

Fingerprints have been used for centuries for identifying persons. In particular, fingerprints are normally used for identifying a person on crime scenes. These latent fingerprints, or latents, refer to fingerprints that are left unintentionally. In general, latents are partial prints recovered from surfaces of objects found on the crime scenes that are touched or gripped by the fingers of a person. Recognising fingerprints makes it possible to link the latents to suspects whose fingerprints were previously entered in fingerprint databases or to establish a link with latent fingerprints coming from various crime scenes.

Unlike fingerprints captured by dedicated electronic apparatus such as contact sensors, which guarantee a certain quality of image, latents are generally obtained using various techniques of chemical and physical development in order to improve their visibility. Although these development techniques improve the characteristics of the fingerprints, latents are generally of very poor quality compared with those obtained by means of this dedicated electronic apparatus. In particular, the information obtained may be partial. Furthermore, the backgrounds of latent fingerprints may exhibit colour and texture combinations that may mask the latent.

However, the performance of a fingerprint recognition system is highly dependent on the quality of the fingerprint images collected. This therefore poses a problem for latent fingerprints, the image quality of which is generally low. This is because the structure of such latent fingerprints, such as the minutiae and the ridges, are difficult to detect by means of algorithms in automatic matching systems.

It is desirable to overcome these various drawbacks of the prior art. It is in particular desirable to propose a method for extracting a signature of a fingerprint that is efficient in the case where these fingerprint images are latents.

DISCLOSURE OF THE INVENTION

According to one embodiment, a method for extracting a signature of a fingerprint shown on a source image is described. The method for extracting a signature comprises:
  transforming said source image into the frequency domain;
  determining n ridge frequencies of said source image by means of a convolutional neural network applied to said transformed image, n being an integer greater than or equal to 1;
  normalizing said source image in response to each of said n ridge frequencies determined;
  extracting n signatures of said fingerprint from said n normalized images.

The method described advantageously makes it possible to extract a signature of a fingerprint even in the case where the source image is of lesser quality. This is because the use of a convolutional neural network makes it possible where applicable to determine a plurality of ridge frequencies, which increases the probability of determining the correct ridge frequency. Applying the neural network to the transformed image enhances the performance of the method.

In a particular embodiment, transforming said source image into the frequency domain comprises applying a Fourier transform.

In a particular embodiment, determining n ridge frequencies of said source image by means of a convolutional neural network applied to said transformed image comprises:
  determining, for each ridge frequency in a set of N ridge frequencies, a probability of said source image having said ridge frequency as its ridge frequency, N being an integer greater than or equal to n;
  selecting the n ridge frequencies associated with the n highest probabilities.

In a particular embodiment, the convolutional neural network is of the U-Net type.

In a particular embodiment, n signatures of said fingerprint from said n normalized images comprises extracting characteristics of minutiae belonging to said fingerprint.

In a particular embodiment, said minutiae characteristics comprise the position and/or the orientation of said minutiae.

In a particular embodiment, the method further comprises comparing said n extracted signatures with at least one extracted signature of a reference fingerprint associated with an individual and identifying the fact that said fingerprint shown on the source image belongs to said individual in the case where at least one of said n extracted signatures is similar to said at least one extracted signature of said reference fingerprint.

In a particular embodiment, the parameters of said convolutional neural network were learnt from a database of reference fingerprints for which the ridge frequency is known.

A device for extracting a signature of a fingerprint shown on a source image comprising:
  means for transforming said source image into the frequency domain;
  means for determining n ridge frequencies of said source image by means of a convolutional neural network applied to said transformed image, n being an integer greater than or equal to 1;
  means for normalizing said source image in response to each of said n ridge frequencies determined;
  means for extracting n signatures of said fingerprint from said n normalized images.

A computer program product is described. The computer program product comprises instructions for implementing, by a processor, the method for extracting a signature according to one of the preceding embodiments, when said program is executed by said processor.

A storage medium is described. The storage medium stores instructions for implementing, by a processor, the method for extracting a signature according to one of the preceding embodiments, when said instructions are executed by said processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

In order to identify a person on crime scenes, it may be necessary to compare an image of a latent with images of reference fingerprints stored in a database. For this purpose, characteristics are extracted from each fingerprint image to generate a signature for said fingerprint. A signature is also called a "template" in the literature. Next a comparison is carried out, in twos, of a signature associated with the latent to be identified with all those of the reference fingerprints. For each reference fingerprint, a score is obtained that is compared with a threshold. If the score is above a predefined threshold, then the latent is identified as belonging to the individual associated in the database with the reference fingerprint. Otherwise the latent and the reference fingerprint do not correspond and therefore the latent is not recognised. It may for example be a case of a trace deposited by one of the normal occupants of the place in question.

Since the images of latents are of mediocre quality, pre-processing these images to increase the quality thereof before any signature is extracted is known. Some of the usual transformations used comprise: a management of the colours, an adjustment of the contrasts, an improvement of the edges, a deletion of the backgrounds and a filtration of the noise and a standardisation of the images. Standardisation of the latent images consists of a scaling of said latents in order to be able then to compare them with any other reference fingerprint stored in the database. The standardisation is implemented using a ridge frequency. If estimating this ridge frequency is easy on the fingerprints of good quality captured by dedicated electronic apparatus, it is much less so on images of latents. To this end, a signature extraction method using a particular estimation of the ridge frequency is described with reference to FIG. 2. The embodiments described below apply both to images of latents and to images of fingerprints captured by means of dedicated electronic apparatus.

Figure 1:
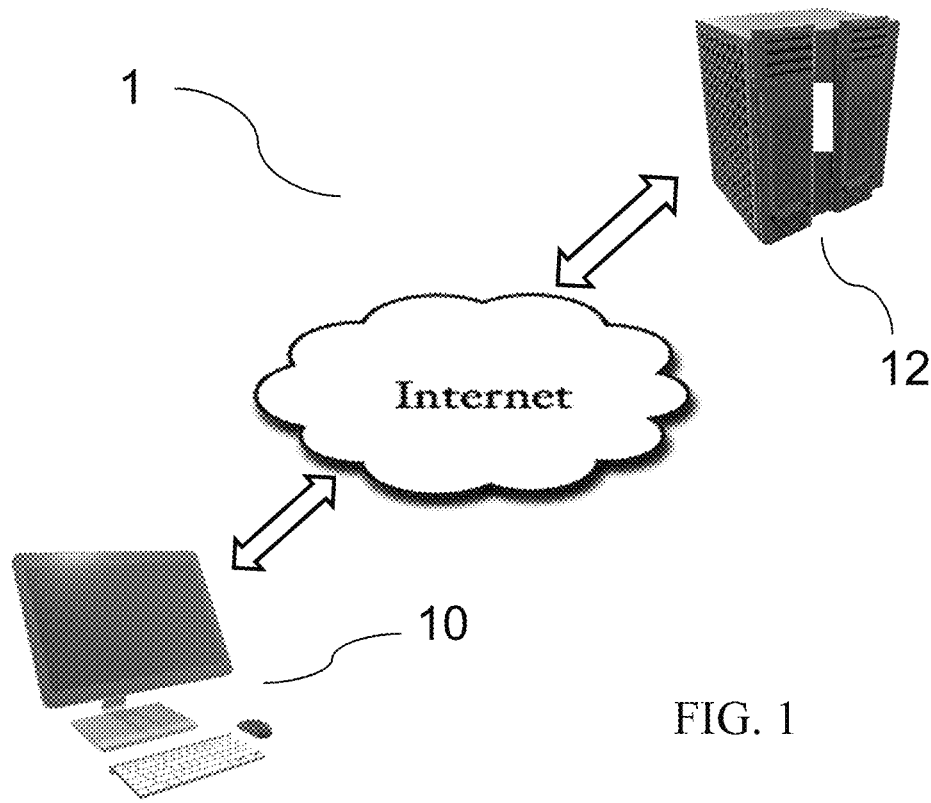
FIG. 1 illustrates the architecture of a system wherein a method for extracting a signature of a fingerprint according to a particular embodiment can be implemented.

FIG. 1 illustrates the architecture of a system wherein a method for extracting a signature of a fingerprint, described below with reference to FIG. 2, can be implemented. The system 1 comprises a client 10 connected to a server 12 through the internet. The server 12 comprises for example a database storing signatures of reference fingerprints. In a variant, the database is external to the server 12. For example, the database associates, with each signature of a reference fingerprint, at least one image of the fingerprint proper, as well as an identification of the individual to whom it belongs. Each signature refers to one or more prints, which themselves refer to an individual. The server 12 stores in memory a neural network trained as described with reference to FIG. 3. The training of the neural network is for example performed by the server 12. In a variant embodiment, the trained neural network is transmitted to the client device 10 and stored in a memory of the client device 10. The client device 10 implements a method for extracting a signature of a fingerprint as described with reference to FIG. 2.

In a variant embodiment, the devices 10 and 12 are merged within a single item of equipment.

Figure 2:
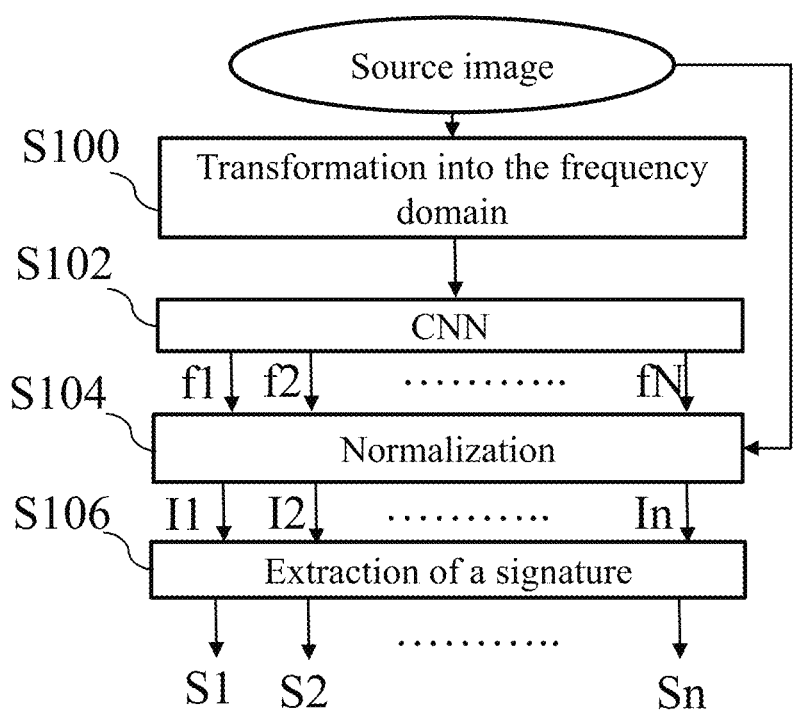
FIG. 2 illustrates schematically a method for extracting a signature of a fingerprint, e.g. a latent, according to a particular embodiment.

FIG. 2 illustrates schematically the method for extracting a signature of a fingerprint, e.g. a latent, according to a particular embodiment. Extracting a signature of a fingerprint is also known by the term "coding".

In a step S100, the source image of the fingerprint is transformed into the frequency domain, for example by a Fourier transform. The Fourier transform is for example a fast Fourier transform FFT. Other transforms may be used provided that they transform an image from the spatial domain to the frequency domain. Thus, in a variant embodiment, a wavelet transform is used.

In a step S102, the transformed image is introduced into a neutral network of the CNN type (the acronym for "Convolutional Neural Network") that is trained, i.e. the weights of which are known, such as the neural network described with reference to FIG. 3. The parameters of the neutral network have, for example, been learnt on a fingerprint database for which the output data of the neutral network, in this case the ridge frequencies, are known. The neural network will have been trained using images of fingerprints transformed using the same transform as that used at the step S100.

Applying the trained CNN neural network to the transformed image makes it possible to obtain, for a set of N ridge frequencies fi, where N is a strictly positive integer and i is an index identifying said ridge frequency, a probability pi that the fingerprint image has a ridge frequency equal to the frequency fi, e.g. the probability that the frequency corresponds to a period of 5 pixels, 6 pixels, . . . , 21 pixels, . . . , 40 pixels. For example, N=36.

In a particular embodiment, a network of the U-Net type called a "fully convolutional network" is applied. The U-Net network is composed of a contracting part and an expansive path, which confers thereon a U-shaped architecture. The contracting part is a typical convolution network that consists of a repeated application of convolutions, each followed by a rectified linear unit (ReLU) and a maximum pooling operation. During the contraction, the spatial information is reduced while the information on the characteristics is increased. The expansive path combines the geographical and spatial characteristics information through a sequence of ascending convolutions and concatenations with high-resolution functionalities coming from the contracting path.

In a step S104, the fingerprint image is normalized using each of the n ridge frequencies associated with the n highest probabilities with n a strictly positive integer less than or equal to N. Thus n normalized images Ii, with i∈[1;n], are obtained, i.e. one normalized image per ridge frequency.

A period Pi equal to the inverse of said ridge frequency corresponds to each of the n ridge frequencies associated with the n highest probabilities. This step S104 thus makes it possible to standardise all the images so as to have the same period between the ridges, referred to as a reference period Pref. For example, Pref=10 pixels.

Thus the source image is normalized so that its ridge period after modification is equal to the reference period Pref. If W and H are respectively the width and height of the source image in number of pixels, then the source image is normalized, for each of the n periods Pi, by resampling so that the dimensions of the normalized image Ii are equal to W*Pref/Pi and H*Pref/Pi. For example, if 3 ridge frequencies and therefore 3 different periods are obtained by the neural network that are equal to P1=5, P2=10 and P3=15 pixels, then 3 normalized images are obtained from the source image. A first normalized image I1 is obtained by taking account of the period P1 by resampling the source image so that the dimensions of the normalized image are equal to 2*W and 2*H. A second normalized image I2 is obtained that is the source image itself since the period P2 is equal to Pref. A third normalized image I3 is obtained by taking account of the period P3 by resampling the source image so that the dimensions of the normalized image are equal to 10/15*W and 10/15*H. Resampling an image is a well known method in the field of image processing. A resampling of an image generally comprises the interpolation of pixels using interpolation filters, e.g. cubic interpolation, quadratic interpolation, nearest-neighbour interpolation, bilinear interpolation, etc. The embodiments described are not limited solely to these resampling methods. Any resampling method allowing increase or reduction of the dimensions of the image can be used.

In a particular embodiment, n=1, i.e. only the frequency associated with the highest probability is taken into account. In this case, a single normalized image I1 is obtained. However, since the prediction of the ridge frequency by the neural network is imperfect, when the probability vector emerging from the network does not exhibit a highly marked peak, the n main peaks, n≥2 corresponding to the n frequencies associated with the n highest probabilities, e.g. the three frequencies associated with the highest probabilities (i.e. n=3), are considered in order to ensure that the correct frequency is indeed extracted.

Figure 4:
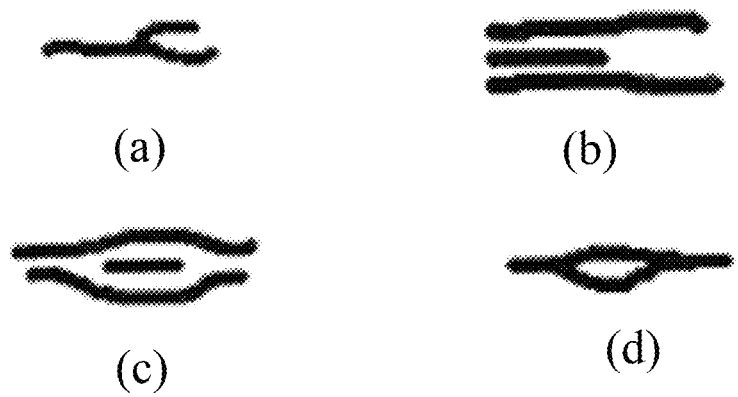
FIG. 4 illustrates various types of minutiae of a fingerprint.

In a step S106, from each of the n normalized images, a signature is extracted from the fingerprint. More precisely, characteristics are extracted from said print in order to generate a signature. This signature codes the useful information of the fingerprint for a subsequent identification. Thus n signatures Si, with i∈[1;n], are obtained, in this case one per standard image Ii. In a particular embodiment, the characteristics extracted are locations of particular points illustrated in FIG. 4, called minutiae, corresponding to bifurcations (a), line terminations (b), islands (c) or lakes (d). More generally, a minutia is a point that is located on the change of continuity of the papillary lines. There exist other types of minutiae not shown in FIG. 4. Thus the signature of the print is composed of a certain number of minutiae, each minutia representing a set of parameters (e.g. coordinates, orientation, etc.). For example, with 15 to 20 minutiae correctly located, it is possible to identify a fingerprint among several millions of examples. In a variant embodiment, other information is used in addition to the minutiae to obtain a signature of the fingerprint such as for example a general pattern of the print or more complex information such as the form of the ridges.

The extraction of a signature generally comprises the filtering of the image (e.g. increase in contrast, reduction in noise) to bring out the major part of useful information, skeletisation of the filtered image in order to obtain a black and white image from which the minutiae are extracted. Among the minutiae extracted, only the most reliable are kept, e.g. around fifteen.

These n signatures can advantageously be used for determining whether the fingerprint in question belongs to a person the fingerprint of whom is stored in a database. For this purpose, the comparison is carried out, in twos, of the n signatures Si associated with the fingerprint in question with the M extracted signatures of the prints in the database, M being a positive integer. In the case where at least one of said n signatures Si extracted is similar to an extracted signature of a reference fingerprint stored in the database, then the fingerprint in question is identified as belonging to the individual associated in the database with this reference fingerprint.

A signature of a fingerprint conventionally being a cloud of points defining the minutiae, a comparison between two signatures is essentially a comparison between two clouds of points. A comparison score is a mark estimating at which point these two clouds of points are superimposed. If the two clouds of points are superimposed then the score is high, otherwise the score is low. If the score is high, then the signatures are similar and it can be concluded therefrom that the fingerprints belong to the same individual. For this purpose, any method of comparing fingerprint signatures can be used.

In a particular embodiment, n×M comparisons in twos are therefore performed. For each comparison a score is calculated. The maximum score obtained is kept.

If this maximum score is higher than a predefined threshold, then the signatures used for calculation thereof are similar. The fingerprint in question is therefore identified as belonging to the individual associated in the database with the reference fingerprint the signature of which was used for calculating this maximum score. Otherwise the fingerprint in question does not correspond to any reference fingerprint in the database and is therefore not recognised.

Figure 3:
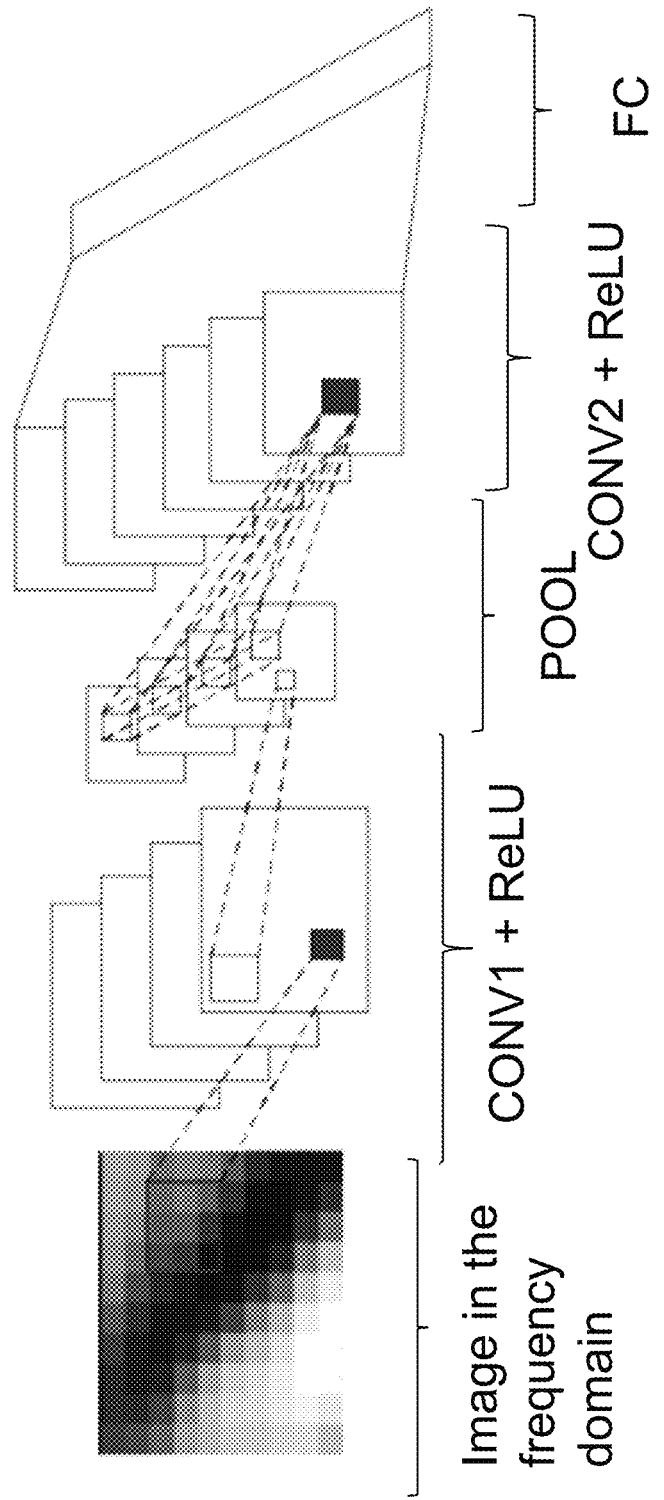
FIG. 3 illustrates a convolutional neural network architecture according to a particular embodiment.

FIG. 3 illustrates a convolutional neural network architecture according to a particular embodiment. A convolutional neural network architecture is formed by a stack of processing layers including:
- at least one convolution layer, CONV1 and CONV2;
- at least one correction layer, ReLU;
- at least one pooling layer POOL, which makes it possible to compress the information by reducing the size of the intermediate image (often by sub-sampling);
- at least one so-called "fully connected" linear combination layer FC.

The convolution layer comprises a convolution or a plurality of successive convolutions by a convolution kernel. At the output of each convolution of input data by the convolution kernel, a set of characteristics representing said input data is obtained. The characteristics obtained are not predefined but learnt by the neural network during a training phase.

During the training phase, the convolution kernel develops so as to "learn" to extract relevant characteristics for a given problem.

The correction layer performs a so-called activation mathematical function on the data obtained at the output of each convolution. The ReLU (the acronym for "Rectified Linear Unit") correction defined by $f(x)=\max(0,x)$ is for example used. This function, also referred to as a "non-saturating activation function", increases the non-linear properties of the decision function and of the whole of the network without affecting the receptive fields of the convolution layer. Other functions (e.g. the hyperbolic tangent function) may be applied.

The pooling layer is an intermediate layer between two convolutions. The purpose of each pooling phase is to reduce the size of the data that it receives as an input, while preserving the important characteristics of these input data. The pooling phase makes it possible to reduce the number of calculations in the convolutional neural network. In particular, the pooling types most used are the Max and the average, where the maximum and average values of a surface are taken into account, respectively.

The linear combination layer always constitutes the last phase of a neural network, whether or not it is convolutional. This phase receives a vector as an input, referred to as an input vector, and produces a new vector as an output, referred to as an output vector. For this purpose, it applies a linear combination to the components of the input vector. The linear combination phase makes it possible to classify the input data of the neural network according to a number of predefined classes N. In the present case, each class corresponds to a ridge frequency value. It therefore returns an output vector of size N. Each component of the output vector is associated with a ridge frequency and represents a probability that the fingerprint image at the input of the neural network has said ridge frequency.

The most common form of a convolutional neural network architecture stacks a few Conv-ReLU layers followed by Pool layers, and repeats this scheme until the input is reduced into a space of sufficiently small size.

Each component of the input vector can contribute differently to the output vector. To do this, when the linear combination is applied, a different weight is applied to each component according to an importance that it is wished to give to the characteristic that this component represents. The linear combination of the linear combination phase is generally followed by a layer transforming the output vector into a probability distribution. The convolutional neural network learns the values of the weights of the linear combination phase in the same way as it learns to change the convolution kernel. It is said that the weight of the linear combination phase and the characteristics of the convolution kernel constitute the parameters of the convolutional neural network.

The parameters of the neural network used at the step S102 were obtained by a learning from images of fingerprints transformed into the frequency domain by a transform identical to that used at the step S100 and the ridge frequency of which is known. Thus, knowing the input images of the neural network and the outputs expected, it is possible to determine (i.e. to learn) the parameters of the neutral network. This learning is done conventionally by using a cost function. It is a case of determining the parameters of the neutral network that make it possible to obtain the required outputs, i.e. the known ridge frequencies, while minimising the cost function. During the learning, the neural network therefore receives as an input images of fingerprints transformed into the frequency domain, and obtains as an output a ridge frequency probability vector the component of which corresponding to the ridge frequency of the print is at 1 and all the other components of which are at 0. The learning will therefore consist of giving it as many fingerprint images as possible, of all the possible ridge frequencies, so that the network can be as robust as possible.

It is conventional to check that a neural network has been trained correctly. To do this, fingerprint images, referred to as validation images, are used that have not served for training the neutral network but the ridge frequency of which is also known. Thus it is checked that the neural network is supplying correct ridge frequencies for these validation images. In general, if an error rate is too high, the neural network is trained once again.

Figure 5:
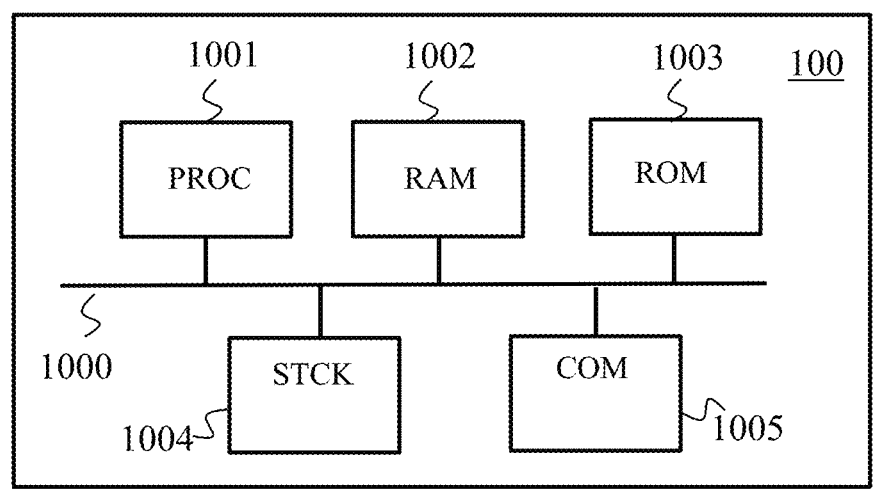
FIG. 5 illustrates schematically an example of hardware architecture of a signature extraction device 100 according to a particular embodiment.

FIG. 5 illustrates schematically an example of hardware architecture of a signature extraction device 100 according to a particular embodiment. In one embodiment, the signature extraction device is included in the client device 10.

According to the example of hardware architecture shown in FIG. 5, the signature extraction device 100 then comprises, connected by a communication bus 1000: a processor or CPU (central processing unit) 1001; a random access memory RAM 1002; a read only memory ROM 1003; a storage unit 1004 such as a hard disk or such as a storage medium reader, e.g. an SD (Secure Digital) card reader; at least one communication interface 1005 enabling the signature extraction device 100 to send or receive information.

The processor 1001 is capable of executing instructions loaded in the RAM 1002 from the ROM 1003, from an external memory (not shown), from a storage medium (such as an SD card), or from a communication network. When the signature extraction device 100 is powered up, the processor 1001 is capable of reading instructions from the RAM 1002 and executing them. These instructions form a computer program causing the implementation, by the processor 1001, of all or part of the method described in relation to FIG. 2. In general, the signature extraction device 100 comprises electronic circuitry configured for implementing all or part of the method described in relation to FIG. 2.

The methods described in relation to FIGS. 2 and 3 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

What is claimed is:

1. A method for extracting a signature of a fingerprint shown on a source image comprising:
    transforming said source image into the frequency domain;
    applying a trained convolutional neural network to said transformed image, said neural network determining as an output for each ridge frequency in a set of N ridge frequencies a probability that said source image has said ridge frequency as its ridge frequency, N being a positive integer;
    selecting the n ridge frequencies associated with the n highest probabilities, wherein n≥2 and n<N;
    normalizing said source image in response to each of said n ridge frequencies selected; and
    extracting n signatures of said fingerprint from said n normalized images.

2. The method according to claim 1, wherein transforming said source image into the frequency domain comprises applying a Fourier transform.

3. The method according to claim 1, wherein the convolutional neural network is of the U-Net type.

4. The method according to claim 1, wherein extracting n signatures of said fingerprint from said n normalized images comprises extracting characteristics of minutiae belonging to said fingerprint.

5. The method according to claim 4, wherein said minutiae characteristics comprise the position and/or the orientation of said minutiae.

6. The method according to claim 1, which further comprises comparing said n extracted signatures with at least one extracted signature of a reference fingerprint associated with an individual and identifying the fact that said fingerprint shown on the source image belongs to said individual in the case where at least one of said n extracted signatures is similar to said at least one extracted signature of said reference fingerprint.

7. The method according to claim 1, wherein the parameters of said convolutional neural network were learnt from a database of reference fingerprints for which the ridge frequency is known.

8. A non-transitory computer-readable storage medium configured to store instructions for implementing, by a processor, the method according to claim 1, when said instructions are executed by said processor.

9. A device for extracting a signature of a fingerprint shown on a source image comprising at least one processor configured to:
- transform said source image into the frequency domain;
- apply a trained convolutional neural network to said transformed image, said neural network determining as an output for each ridge frequency in a set of N ridge frequencies a probability that said source image has said ridge frequency as its ridge frequency, N being a positive integer;
- select the n ridge frequencies associated with the n highest probabilities, wherein n≥2 and n<N;
- normalize said source image in response to each of said n ridge frequencies selected; and
- extract n signatures of said fingerprint from said n normalized images.

* * * * *